United States Patent
Tucker et al.

(10) Patent No.: US 9,677,514 B2
(45) Date of Patent: Jun. 13, 2017

(54) AIR INDUCTION SYSTEM

(71) Applicant: GM GLOBAL TECHNOLOGY OPERATIONS LLC, Detroit, MI (US)

(72) Inventors: Eric R. Tucker, Waterford, MI (US); Steven A. Kornburger, Oxford, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 162 days.

(21) Appl. No.: 14/479,553

(22) Filed: Sep. 8, 2014

(65) Prior Publication Data
US 2016/0069307 A1 Mar. 10, 2016

(51) Int. Cl.
| | |
|---|---|
| F02B 33/00 | (2006.01) |
| F02M 35/02 | (2006.01) |
| F02B 33/44 | (2006.01) |
| F02M 35/024 | (2006.01) |
| F02B 37/007 | (2006.01) |
| F02M 35/10 | (2006.01) |

(52) U.S. Cl.
CPC ..... *F02M 35/02433* (2013.01); *F02B 37/007* (2013.01); *F02M 35/021* (2013.01); *F02M 35/0207* (2013.01); *F02M 35/02483* (2013.01); *F02M 35/10144* (2013.01); *F02M 35/10386* (2013.01); *Y02T 10/144* (2013.01)

(58) Field of Classification Search
CPC ....... F02M 35/02433; F02M 35/02483; F02M 35/10144; F02B 37/007
USPC .................... 123/562, 198 E; 60/612, 605.1; 55/509–510, 302, DIG. 28
See application file for complete search history.

(56) References Cited

U.S. PATENT DOCUMENTS

| | | | | |
|---|---|---|---|---|
| 2,871,842 A | * | 2/1959 | Dolza | F02B 27/00 123/184.34 |
| 3,092,479 A | * | 6/1963 | Hedberg | B01D 46/0021 55/302 |
| 3,277,876 A | * | 10/1966 | Abts | F01M 13/022 55/510 |
| 3,293,830 A | * | 12/1966 | Mckinlay | F02M 35/04 55/510 |
| 3,417,551 A | * | 12/1968 | Bonell | F02M 35/024 55/509 |
| 3,722,182 A | * | 3/1973 | Gilbertson | B03C 3/155 55/510 |

(Continued)

FOREIGN PATENT DOCUMENTS

| | | | | |
|---|---|---|---|---|
| DE | 3838264 A1 | * | 5/1990 | F02B 75/22 |
| JP | 2010048480 A | * | 3/2010 | |

*Primary Examiner* — Thai Ba Trieu
(74) *Attorney, Agent, or Firm* — Cantor Colburn LLP

(57) ABSTRACT

An air induction system for delivering equal quantities of combustion air to an internal combustion engine has an air box assembly comprising a housing that defines a filter chamber that is configured to receive an air filter assembly, an air inlet that admits the fresh air into the housing and the filter chamber and outlets extending from the housing. The air filter assembly further comprises a filter media disposed between the air inlet and the outlets to define a filtered air chamber on a flow side of the filter media and a partition extending across the filtered air chamber to divide filtered, fresh air passing through the filter media into two flow paths, the divided flows paths exiting the housing and the filtered air chamber through the outlets.

16 Claims, 3 Drawing Sheets

(56) References Cited

U.S. PATENT DOCUMENTS

| | | | | |
|---|---|---|---|---|
| 4,162,660 A * | 7/1979 | Albertson | F02M 35/09 55/DIG. 28 |
| 4,233,043 A * | 11/1980 | Catterson | F02M 35/024 55/DIG. 28 |
| 4,543,112 A * | 9/1985 | Ackley | B01D 53/0415 55/509 |
| 4,756,233 A * | 7/1988 | Takahashi | F15B 21/041 55/417 |
| 4,781,027 A * | 11/1988 | Richter | F02B 37/007 60/602 |
| 4,897,097 A * | 1/1990 | Yamamura | F02M 35/024 55/419 |
| 5,813,384 A * | 9/1998 | Lavender | F02M 35/116 123/198 E |
| 6,423,108 B1 * | 7/2002 | Mueller | F02M 35/08 123/198 E |
| 6,755,881 B2 * | 6/2004 | Ruehle | B01D 46/0002 123/198 E |
| 6,978,773 B2 * | 12/2005 | Hunter | F02M 25/06 123/572 |
| 7,107,972 B1 * | 9/2006 | Jones | F02B 33/34 123/562 |
| 7,384,440 B2 * | 6/2008 | Takano | F02M 35/0203 123/198 E |
| 7,640,794 B2 * | 1/2010 | Farmer | F02B 37/007 73/114.13 |
| 8,001,782 B2 * | 8/2011 | Pursifull | F02B 37/007 123/562 |
| 8,133,292 B2 * | 3/2012 | Morita | B62K 11/04 123/198 E |
| 8,359,858 B2 * | 1/2013 | Pursifull | F02B 37/007 123/562 |
| 8,397,499 B2 * | 3/2013 | Doering | F02D 41/0007 123/562 |
| 8,668,754 B2 * | 3/2014 | Furumoto | F02M 35/0215 55/342 |
| 8,752,533 B2 * | 6/2014 | Schultz | F02M 35/02483 123/198 E |
| 8,790,431 B2 * | 7/2014 | Muenkel | B01D 46/0021 55/385.3 |
| 8,950,183 B2 * | 2/2015 | Nixon | F02M 35/10262 60/611 |
| D736,263 S * | 8/2015 | Schultz | D15/5 |
| 9,103,303 B2 * | 8/2015 | Schultz | F02M 35/02483 |
| 2006/0107912 A1 * | 5/2006 | Hoche | F02M 35/10039 123/73 A |
| 2010/0035534 A1 * | 2/2010 | Kajiya | B60H 1/00471 454/141 |
| 2014/0165513 A1 * | 6/2014 | Oelpke | F02M 35/0216 55/385.1 |
| 2014/0230384 A1 * | 8/2014 | Girondi | B01D 46/0005 55/419 |
| 2015/0075123 A1 * | 3/2015 | Carter | B01D 46/002 55/419 |
| 2015/0204234 A1 * | 7/2015 | Bauer | F02B 29/0462 60/599 |

* cited by examiner

AIR INDUCTION SYSTEM

FIELD OF THE INVENTION

Exemplary embodiments of the invention are directed to air induction systems for internal combustion engines and, more specifically, to an air filter for supplying filtered combustion air to dual inlet ports of an engine.

BACKGROUND

Combustion air is supplied to an internal combustion engine through an induction system that typically comprises an air cleaning system having an air filter that operates to remove debris and other contaminants from entering the engine and other critical components thereof. Air filters are designed to minimize their impact on the air flow and are typically utilized for one function; cleaning the combustion air.

Modern internal combustion engines utilize sensors such as Mass Air Flow (MAF) sensors to determine the quantity of combustion air passing through the induction system and to the engine. In engines with two turbochargers, the flow of combustion air must be carefully measured and delivered or engine performance will suffer. Induction system inlet branch bias sensitivities may occur when the branches are of unequal length. When a single air box is used to feed two branches, the ducts may experience low flow (ex. at idle) air toggling which stalls the MAF sensors and prevents measurement.

It is desirable to use a single air box from a packaging and cost perspective without a negative impact on induction system performance.

SUMMARY

In one exemplary embodiment an internal combustion engine system comprises an air induction system comprising an intake runner that collects fresh air for delivery to an air box assembly containing an air filter assembly that operates to remove contaminants from the fresh air prior to its delivery downstream and to other components of the internal combustion engine system. The air box assembly comprises a housing that defines a filter chamber configured to receive the air filter assembly, an air inlet that admits the fresh air from the intake runner into the housing and the filter chamber, and outlets opening through the housing. The air filter assembly further comprises a filter media disposed between the air inlet and the outlets to define a filtered air chamber on a flow side of the filter media and a partition extending across the filtered air chamber to divide filtered, fresh air passing through the filter media into two flow paths, the divided flow paths exiting the housing and the filtered air chamber through the outlets.

In another exemplary embodiment an internal combustion engine system comprises an air induction system comprising an intake runner that collects fresh air for delivery to an air box assembly containing an air filter assembly that operates to remove contaminants from the fresh air prior to its delivery downstream and to other components of the internal combustion engine system. The air box assembly comprises a housing that defines a filter chamber configured to receive the air filter assembly, an air inlet that admits the fresh air from the intake runner into the housing and the filter chamber, and outlets opening through the housing. The air filter assembly further comprises a filter media disposed between the air inlet and the outlets to define a filtered air chamber on a flow side of the filter media and a partition extending across the filtered air chamber to divide filtered, fresh air passing through the filter media into two flow paths. The divided flow paths exit the housing and the filtered air chamber through the outlets, wherein the partition is integral with the housing and extends outwardly from a wall thereof, providing a mounting location for the air filter assembly.

In yet another embodiment an air induction system for delivering equal quantities of combustion air to twin turbochargers of an internal combustion engine has an air box assembly comprising a housing that defines a filter chamber configured to receive an air filter assembly, an air inlet that admits the fresh air into the housing and the filter chamber and outlets opening through the housing. The air filter assembly further comprises a filter media disposed between the air inlet and the outlets to define a filtered air chamber on a flow side of the filter media and a partition extending across the filtered air chamber to divide filtered, fresh air passing through the filter media into two flow paths, the divided flow paths exiting the housing and the filtered air chamber through the outlets.

The above features and advantages, and other features and advantages of the invention, are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
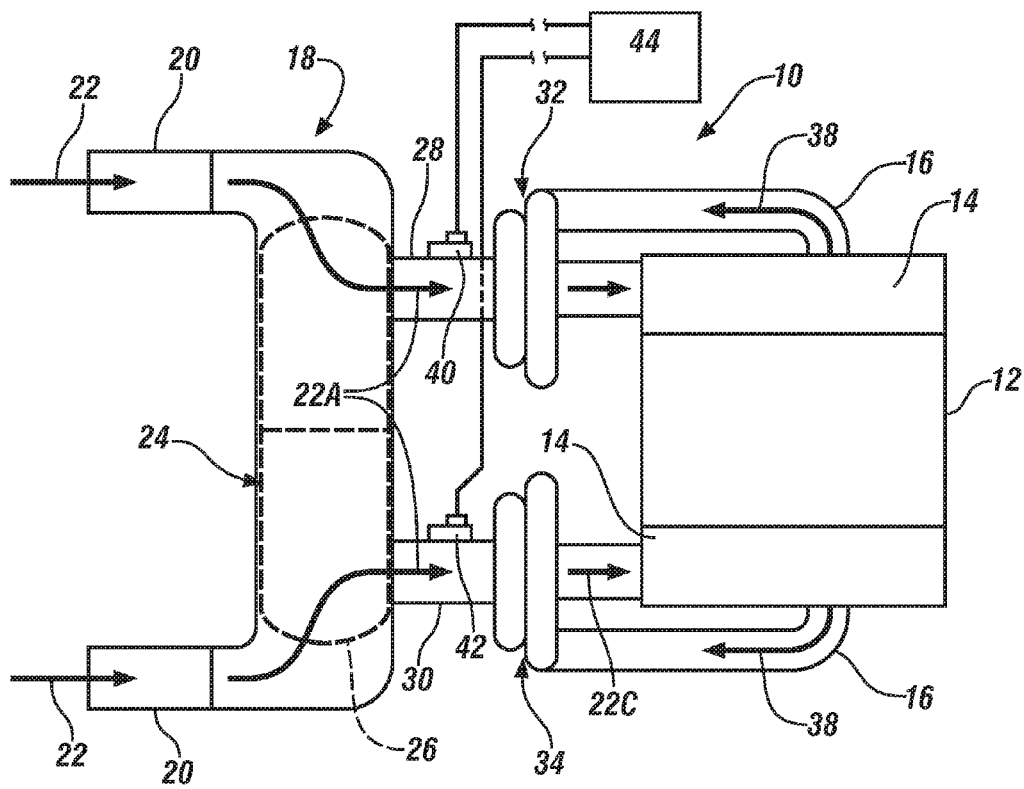
FIG. 1 is a schematic plan view of an internal combustion engine system embodying features of the invention.

The following description is merely exemplary in nature and is not intended to limit the present disclosure, its application or uses. It should be understood that throughout the drawings, corresponding reference numerals indicate like or corresponding parts and features. As used herein, the term vehicle is not limited to just an automobile, truck, van or sport utility vehicle, but includes any self-propelled or towed conveyance suitable for transporting a burden.

Referring to FIG. 1, in an exemplary embodiment, an internal combustion engine system 10 comprises an engine block 12, intake manifolds 14 and exhaust manifolds 16. In the engine system illustrated, the engine is a V-configured engine, but it should be noted that this is for exemplary purposes only and that other configurations (ex. In-line, rotary) are also contemplated. An air induction system 18 comprises an intake runner or runners 20 that collect fresh air 22 for delivery to an air box 24. The air box, to be described in further detail herein, houses an air filter assembly 26 that operates to remove contaminants from the fresh air 22 prior to its delivery downstream and to other components of the internal combustion engine system 10. Outlets 28 and 30 open through, and extend from the air box 24. Fresh, filtered air 22A travels through the outlets to turbochargers 32 and 34 where the air is compressed prior to delivery to respective inlet manifolds 14 as combustion air 22C for mixture with fuel and combustion in the engine. The combusted fuel and combustion air 22C exits the engine through exhaust manifolds 16 as exhaust gas 38 and is fed to the turbochargers 32 and 34 where it powers the turbines (not shown) of each unit to compress the fresh, filtered air 22A. Mass Air Flow (MAF) sensors 40 and 42 are located in outlets 28 and 30 such that they are in fluid contact with the filtered air flow 22A. The MAF sensors 40, 42 monitor the flow of air through the outlets and are in signal communication with a controller such as engine controller 44. The controller 44 monitors the air flow through each outlet 28, 30 and adjusts the fuel delivered to the internal combustion engine system based on the quantity of air delivered. In internal combustion engine systems having two turbochargers (twin-turbo systems) performance is dependent upon the delivery of equal quantities of combustion air 22C at each intake manifold 14.

Figure 2:
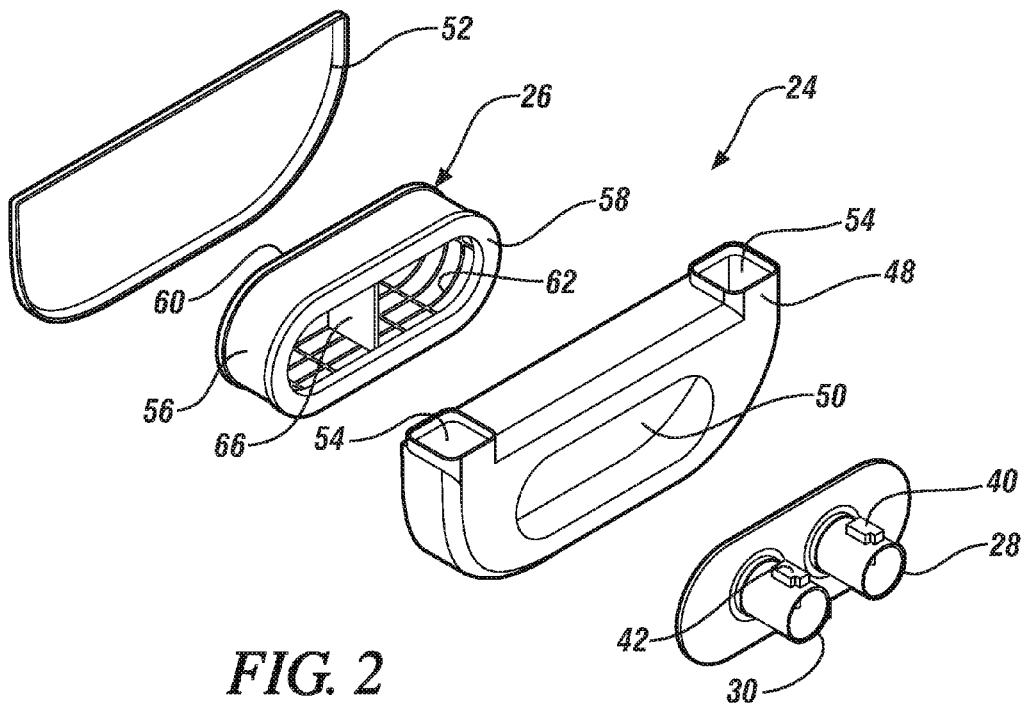
FIG. 2 is a disassembled, isometric view of an air box assembly from the engine system of FIG. 1, embodying features of the invention.
Figure 3:
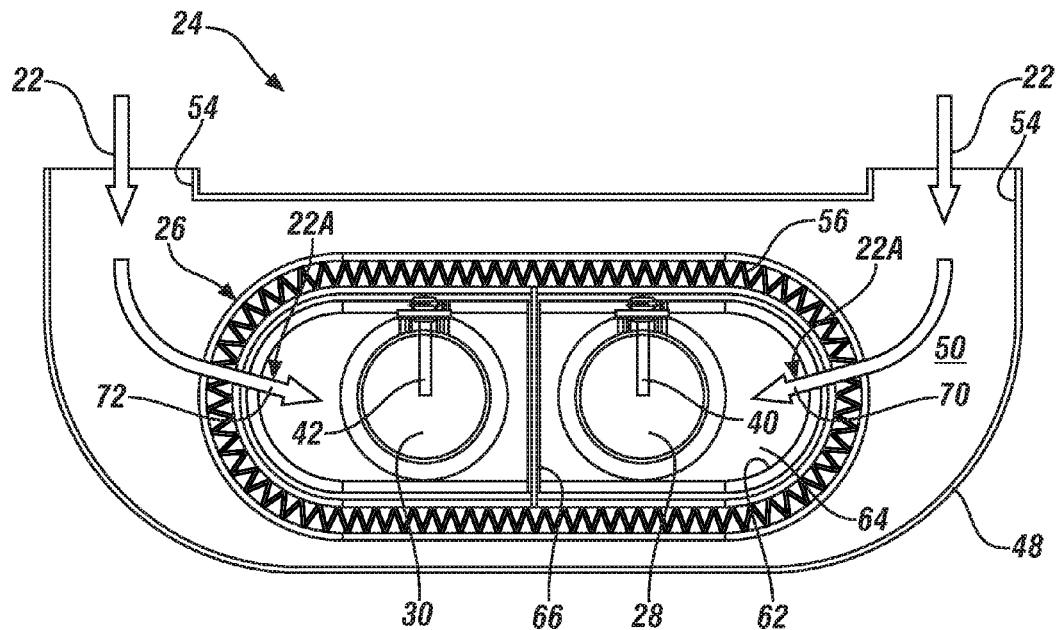
FIG. 3 is a shadow, plan view of the air box assembly of FIG. 2.

Referring now to FIGS. 2 and 3, with continuing reference to FIG. 1, air box 24 comprises a housing 48 that is constructed of a rigid or semi-rigid material such as plastic or sheet-metal that will exhibit the requisite durability in an under-hood environment. The housing 48 defines a filter chamber 50 therein that is configured to receive filter 26. One wall 52 of the housing 48 may be removable to allow for replacement of the air filter 26 during servicing of the internal combustion engine system 10. The removable portion 52 may vary depending on the configuration of the housing 48 and the location of the housing in the vehicle (not shown). One or more air inlets 54 admit fresh air 22 from intake runner(s) 20 into the filter chamber 50. Similarly, in an embodiment, one wall 74, FIG. 6, of the housing 48 may be removable to allow for replacement or servicing of the MAF sensors 40 and 42. The removable portion 74 includes outlets 28 and 30 through which the sensors extend to monitor the flow of air therethrough.

The filter assembly 26 is, in the illustration, constructed in an oval format with a filter media 56 extending about the perimeter of the oval in a centrally located position and sealing members 58 and 60 capping each end thereof. The sealing members are pressed between and against the walls of the housing 48, when the filter assembly is disposed therein, to define a seal between the filter media 56, the air inlets 54 and the outlets 28 and 30. As a result, fresh air entering the air box 24 is forced through the filter media 56 prior to exiting the air box through outlets 28 and 30 as filtered, fresh air 22A. A support structure or cage 62 may be placed adjacent to the filter media 56 (typically on the downstream facing side) to aide in supporting the filter media under high flow conditions.

Figure 4:
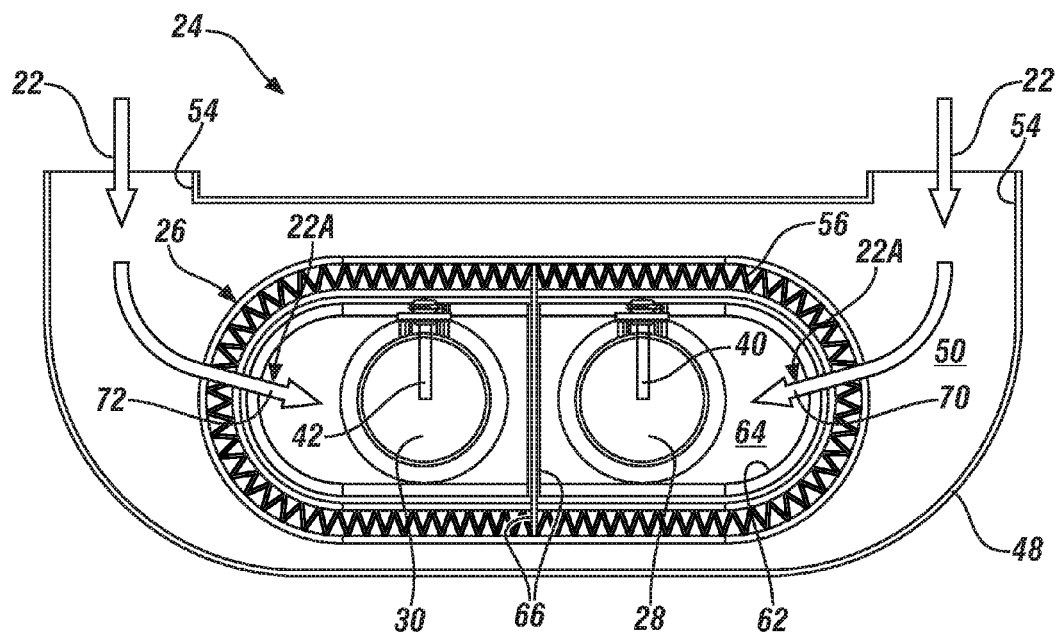
FIG. 4 is a shadow, plan view of another embodiment of the air box assembly of FIG. 2.

In an embodiment, the air filter assembly 26 defines a filtered air chamber 64 on the inner, flow side of the filter media 56 within the perimeter thereof. A partition 66 extends across the filtered air chamber to effectively divide the filtered, fresh air 22A passing through the filter media 56 into two flow paths 70 and 72. In an exemplary embodiment the two flow paths 70 and 72 are substantially equal as required by the twin-turbo configured internal combustion engine system 10. The divided flows 70 and 72 exit the air box 24 through outlets 28 and 30 where the flow volume is measured by MAF sensors 40 and 42. In another embodiment, as illustrated in FIG. 4, the partition 66 may extend through the filter media 56 of the air filter assembly 26 to avoid any seepage (cross-talk) of the two flow paths 70 and 72 that could unbalance the precise flows required through outlets 28 and 30 and to the turbochargers 32 and 34. In the embodiments described thus far, it should be noted that the housing 48 of the air box 24 may utilize a single inlet 54 or more than one inlet as determined by design considerations since the flow of fresh air 22 entering the housing is free to flow about the air filter assembly 26 prior to passing through the filter media 56 and into the filtered air chamber 64 as separate flow paths 70 and 72.

Figure 5:
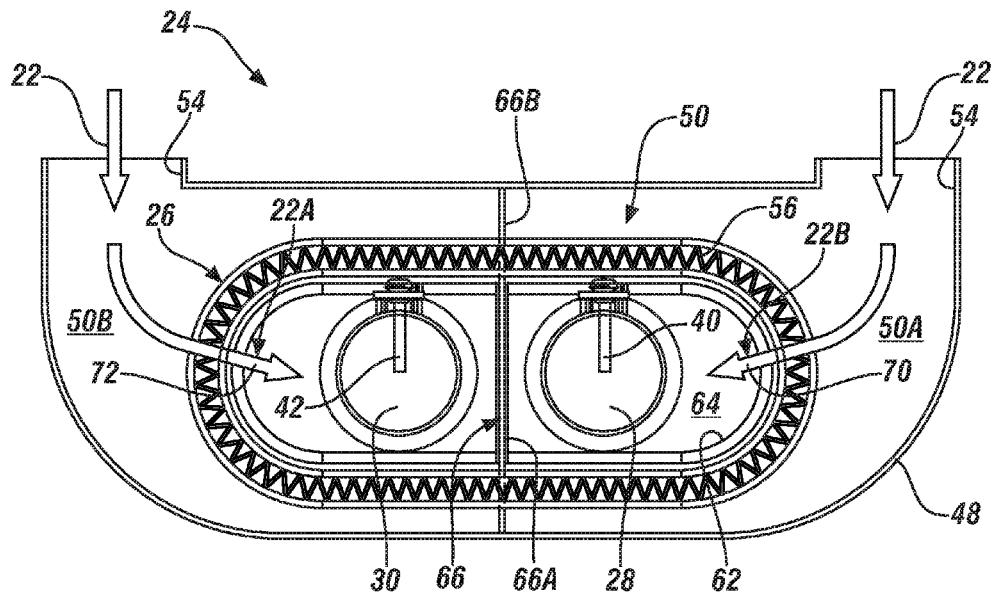
FIG. 5 is a shadow, plan view of yet another embodiment of the air box assembly of FIG. 2.

Referring now to FIG. 5, with continuing reference to FIGS. 1 and 2, in some instances it may be undesirable to allow the flow of fresh air 22 entering the housing 48 of the air box 24 to circulate freely about the filter chamber 50. Such circulation may, in some cases unbalance the airflow resulting in uneven air mass in flow paths 70 and 72. In an embodiment, partition 66 is configured to extend across the filter chamber 50, including the filtered air chamber 64 defined by the filter media 56 to thereby divide the filter chamber into two chambers 50A and 50B; effectively defining a dual intake system. The partition 66 may comprise a two-part construction having a filter supported partition 66A and a housing supported partition 66B that align to provide a full partition 66 that effectively divides the filter chamber 50 of the air box 24 and separates the incoming fresh air flows 22 entering through air inlets 54.

Figure 6:
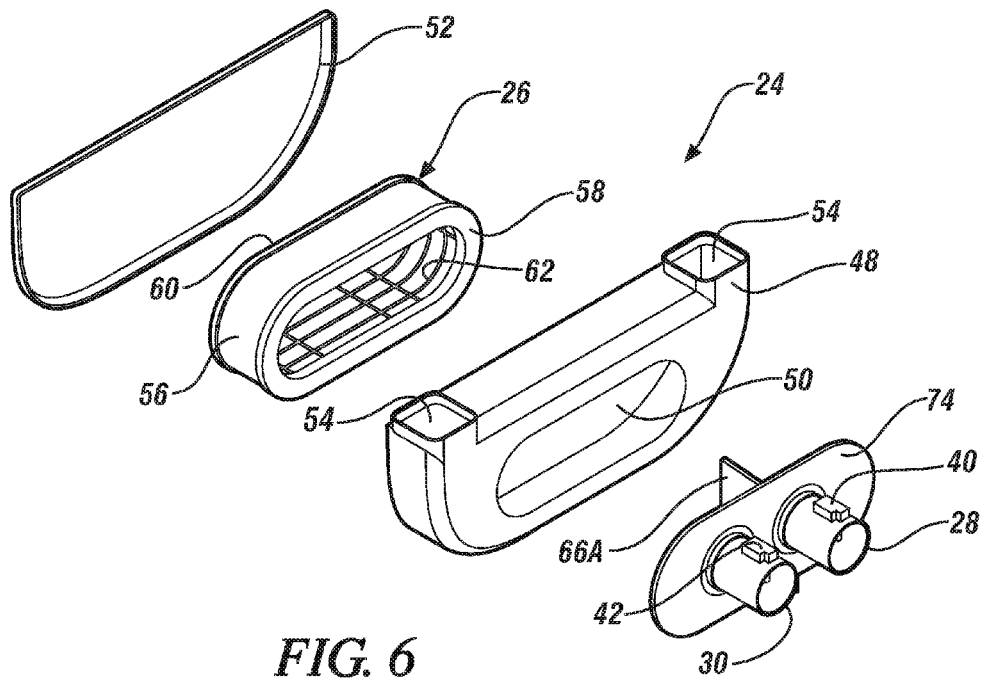
FIG. 6 is a disassembled, isometric view of an alternate embodiment of an air box assembly from the engine system of FIG. 1, embodying features of the invention.

Referring to FIG. 6, although the embodiments described thus far have been directed towards the use of air filter assemblies 26 having a partition 66, or a portion thereof disposed therein, it is envisioned that in some instances it may be desirable to utilize a similar air filter assembly for more than one application. In an embodiment it is contemplated that a partition 66A may be integral with the housing 48 such that it extends outwardly from a wall 74, for instance, providing a mounting location for the air filter assembly 26. In the embodiment it is preferable that the partition extend between the outlets 28 and 30, sufficiently to divide the filter chamber 50 and have a dimension allowing it to slidingly enter and divide the filtered air chamber 64.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation of material to the teachings of the invention without departing from the essential scope thereof. Therefore, it is intended that the invention not be limited to the particular embodiments disclosed, but that the invention will include all embodiments falling within the scope of the application.

What is claimed is:

1. An internal combustion engine system comprising:
   an air induction system comprising an intake runner receptive to a fresh air stream for delivery to an air box assembly containing an air filter assembly that operates to remove contaminants from the fresh air stream prior to delivery downstream and to other components of the internal combustion engine system including at least one turbocharger, the air box assembly comprising:
   a housing that defines a filter chamber configured to receive the air filter assembly;
   at least one air inlet that admits the fresh air stream from the intake runner into the housing and the filter chamber; and outlets opening through the housing, the air filter assembly further comprising:
a filter media disposed between the air inlet and the outlets to define a filtered air chamber on a flow side of the filter media; and
a partition extending across the filtered air chamber through the air filter assembly to divide filtered, fresh air passing through the filter media into divided flow paths, the divided flow paths exiting the housing and the filtered air chamber through the outlets.

2. The internal combustion engine system of claim 1, wherein the divided flow paths are receptive to substantially equal masses of filtered, fresh air.

3. The internal combustion engine system of claim 2, further comprising Mass Air Flow (MAF) sensors located in the outlets and in fluid contact with the divided flow paths of filtered, fresh air to monitor airflow through the outlets.

4. The internal combustion engine system of claim 2, wherein the at least one turbocharger includes a turbocharger disposed downstream of the outlets.

5. The internal combustion engine system of claim 1, wherein the air filter assembly is constructed as one of a round or oval configuration to thereby define said filtered air chamber within a perimeter thereof.

6. The internal combustion engine system of claim 5, wherein the air filter assembly includes the oval configuration and the filter media includes an oval shape that is received by and centrally located within the air filter assembly, the air filter assembly including a first end having a first oval perimeter, a second end having a second oval perimeter, first sealing member that extends about the first oval perimeter and a second sealing member that extends about the second oval perimeter.

7. The internal combustion engine system of claim 6, wherein the air box assembly further comprises housing walls configured to press against corresponding ones of the first and second sealing members when the air filter assembly is disposed therebetween to define a seal between the filter media the at least one air inlet and the outlets, wherein fresh air entering the air box assembly is forced through the filter media prior to exiting the air box assembly through the outlets as filtered, fresh air.

8. The internal combustion engine system of claim 7, wherein a housing wall is removable to allow for replacement of the air filter assembly.

9. The internal combustion engine system of claim 1, wherein the at least one air inlet of the air box assembly comprises two air inlets that admit the fresh air stream into the housing and the filter chamber.

10. The internal combustion engine system of claim 9, wherein the partition extends across the filter chamber, including the filtered air chamber defined by the filter media, to thereby divide the filter chamber into two chambers, defining a dual intake system.

11. The internal combustion engine system of claim 10, wherein the partition comprises a two-part construction having a filter supported partition and a housing supported partition that align to provide a full partition that divides the filter chamber and separates the fresh air stream entering through the two air inlets.

12. An internal combustion engine system comprising:
an air induction system comprising an intake runner receptive to a fresh air stream for delivery to an air box assembly containing an air filter assembly that operates to remove contaminants from the fresh air stream prior to delivery downstream and to other components of the internal combustion engine system including at least one turbocharger, the air box assembly comprising:
a housing that defines a filter chamber configured to receive the air filter assembly;
an air inlet that admits fresh air from the intake runner into the housing and the filter chamber; and
outlets opening through the housing, the air filter assembly further comprising:
a filter media disposed between the air inlet and the outlets to define a filtered air chamber on a flow side of the filter media; and
a partition extending across the filtered air chamber through the air filter assembly to divide filtered, fresh air passing through the filter media into divided flow paths, the divided flow paths exiting the housing and the filtered air chamber through the outlets, wherein the partition is integral with the housing and extends outwardly from a wall thereof, providing a mounting location for the air filter assembly.

13. An air induction system for delivering equal quantities of combustion air to twin turbochargers of an internal combustion engine has an air box assembly comprising:
a housing that defines a filter chamber configured to receive an air filter assembly;
two air inlets that admit fresh air into the housing and the filter chamber; and
outlets opening through the housing, the air filter assembly further comprising:
a filter media disposed between the air inlet and the outlets to define a filtered air chamber on a flow side of the filter media; and
a partition extending across the filtered air chamber to divide filtered, fresh air passing through the filter media into two chambers defining a dual intake system having divided flow paths, the divided flow paths exiting the housing and the filtered air chamber through the outlets.

14. The air induction system of claim 13, wherein the divided flow paths are receptive to substantially equal masses of filtered, fresh air.

15. The air induction system of claim 14, further comprising Mass Air Flow (MAF) sensors located in the outlets and in fluid contact with the divided flow paths of filtered, fresh air to monitor airflow through the outlets.

16. The air induction system of claim 13, wherein the partition comprises a two-part construction having a filter supported partition and a housing supported partition that align to provide a full partition that divides the filter chamber and separates incoming fresh air flows entering through the air inlets.

* * * * *